US006463099B1

(12) United States Patent
Cao et al.

(10) Patent No.: US 6,463,099 B1
(45) Date of Patent: Oct. 8, 2002

(54) BLIND CHANNEL EQUALIZERS AND METHODS OF BLIND CHANNEL EQUALIZATION

(75) Inventors: Xiren Cao, Kowloon (HK); Zhi Ding, Auburn, AL (US); Jie Zhu, Kowloon (HK)

(73) Assignee: The Hong Kong University of Science and Technology, Knoloon (HK)

( * ) Notice: Subject to any disclaimer, the term of this patent is extended or adjusted under 35 U.S.C. 154(b) by 0 days.

(21) Appl. No.: 09/313,817

(22) Filed: May 18, 1999

(51) Int. Cl.[7] .............................. H03H 7/30; G06F 17/10
(52) U.S. Cl. ...................................... 375/232; 708/322
(58) Field of Search ................................. 375/232, 229, 375/341, 233, 234, 235, 346; 708/322, 323; 455/501, 66, 67.3; 333/28 R

(56) References Cited

U.S. PATENT DOCUMENTS 5,602,507 A * 2/1997 Suzuki ........................ 329/304
5,619,533 A * 4/1997 Dent ........................... 375/232
6,219,561 B1 * 4/2001 Raleigh ....................... 342/367

* cited by examiner

*Primary Examiner*—Chi Pham
*Assistant Examiner*—Khai Tran
(74) *Attorney, Agent, or Firm*—Wolf, Greenfield & Sacks, P.C.

(57) ABSTRACT

Blind channel equalization methods, receivers and systems incorporating the same for use in a multiple-input, multiple-output, (MIMO) wireless communication system are described. Signal equalization is achieved by devising a characteristic system convolution matrix and algebraically operating on said convolution matrix by equalizing functions generated from second order statistics of the received signals. Such equalization is done with an aim to removing or suppressing inter-symbol interference elements from the received signals to enable satisfactory signal recovery. The described methods, systems and receivers, have the benefits of retaining the speed and processing power efficiency of equalization algorithms based on second order statistics while substantially insensitive to the accuracy of channel order estimates.

24 Claims, 11 Drawing Sheets

BLIND CHANNEL EQUALIZERS AND METHODS OF BLIND CHANNEL EQUALIZATION

FIELD OF THE INVENTION

The present invention relates to equalizers for receivers of wireless communication systems and more particularly to receiver equalizers more commonly known as blind channel equalizers. This invention also relates to methods of blind channel equalization for receivers in wireless communication.

BACKGROUND OF INVENTION

'Channel Equalization' generally refers to signal equalization techniques which do not require prior characterization of the transmission channel as a pre-requisite for satisfactory signal recovery. Equalization is always necessary in wireless communication to remove or alleviate signal contamination during transmission, for example, by co-channel interference (CCI) or inter-symbol interference (ISI).

The potential application of blind channel equalization techniques in wireless communication has made them one of the most active areas of research in recent years. Initial studies of blind equalization have been concentrated on single input systems but there are now increasing interests in blind channel equalization in multiple-input and multiple-output (MIMO) systems. Algorithms based only on second order statistics ("SOS") of the received signals are attractive because of their simplicity and low requirement on processing power. For these reasons, it would be desirable to develop SOS-based blind channel equalizing for MIMO systems.

Known blind channel-equalization algorithms are typically based on second- and higher-order statistics of the received signals. Recent research developments have shown that blind channel equalization can be successfully done in single-input, multiple-output ("SIMO") systems relying only on second-order statistics of the received signals provided that there is sufficient receiver signal diversity. This requirement means that the receiver output channels must be diverse enough to share no common zeroes (see for example, L. Tong, et. al, "Blind Channel Identification Based on Second-Order Statistics: A Frequency Domain Approach" *IEEE Trans. on Information Technology, no.1*, pp.329–334, Mar. 1995"). It is also appreciated that many of the known algorithms for blind channel-equalization in SIMO systems can be generalized to MIMO systems as long as the virtual users at the transmitter input is smaller than the number of virtual output at the receiving end of the transmission system.

It is well-known that the performance of SOS-based ISI equalizing algorithms rely critically on channel diversity, which is usually achieved either by antenna diversity or by over-sampling of output signals when the channels have excess bandwidth. Blind channel identification is no longer possible with SOS based algorithms alone and higher order statistics ("HOS") are often required to compensate for the loss of information when there are common, or near common, zeroes among the diversity channels. Therefore, known blind equalization algorithms for ISI suppression used in MIMO systems are hitherto typically based on both SOS and HOS of the received signals.

Another major drawback of pure SOS based equalizing algorithms is their sensitivity towards variation in channel order estimate, since it is well known that accurate channel estimate is difficult to achieve. Poor blind channel identification will inevitably result unless there is an accurate channel order estimate.

Furthermore, while it is common knowledge that blind channel identification can be performed in blind equalizing receiver systems before actual signal reception, it is well-known that channel estimation errors tend to be magnified by linear equalizers and is therefore not desirable for linear MIMO systems.

OBJECT OF THE INVENTION

It is therefore an object of the present invention to provide blind equalizers and methods for blind equalization for wireless communication which are primarily based on second-order statistics of the received signals. It is also an object that such blind equalizers or equalization methods are operable without the need of channel identification information and are less sensitive to channel order estimates which is a drawback common to most known SOS based blind equalizing receiver.

SUMMARY OF THE INVENTION

According to the present invention, there is provided a signal equalization method for a multiple-input, multiple-output (MIMO) wireless communication system in which the wireless channel of the communication system can be modeled by a finite-impulse-response (FIR) system of order integer M. The communication system is provided with system diversity having a receiver diversity factor of integer N. The equalization method includes the steps of devising a system convolution matrix A, wherein said matrix A is a generalized Sylvester matrix comprising (L+1) block rows and (M+L+1) block columns of sub-matrices each of which block is a matrix of dimension N×d, wherein the number of rows of A, being the product N and (L+1), is made to exceed the number of columns of A, being product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=As(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a N×1 vector due to system diversity; calculating second order statistics of said vector of sampled channel output signals o(m); selecting suitable linear equalizing functions (G) derived from said second order statistics of said sampled channel output signals; and algebraically operating the said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

Preferably, the aforementioned second order statistics are the auto-covariance, R(k), where k is a natural number, of the received and sampled channel output signals, o(m).

Preferably, the suitable linear function G is obtained by multiplying the auto-covariance R(k) of the received and sampled channel output signals, o(m), by the pseudo-inverse of the auto-covariance of R(O) and is equal to R(k)R(o)#, said equalized received signals are then obtained by multiplying said sampled channel output signals, o(m), by said linear function with k=M+L.

According to a second aspect of the present invention, there is provided a receiver equalizer for a multiple-input, multiple-output (MIMO) wireless communication system in which the wireless channel of said communication system being modeled by a finite-impulse-response (FIR) system of order integer M, said communication system is provided with system diversity having a receiver diversity factor of integer N. The equalizer includes means for devising a system convolution matrix A, wherein said matrix A is a generalized Sylvester matrix comprising (L+1) block rows and (M+L+1) block columns of sub-matrices each of which block is a matrix of dimension Nxd, wherein the number of rows of A, being the product of N and (L+1), is made to exceed the number of columns of A, being the product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals which immediately precede said selected sampled channel output signal y(m), each said sampled channel output signal is a Nx1 vector due to system diversity; means for calculating second order statistics of said vector of sampled channel output signals o(m); means for selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

According to another aspect of the present invention, there is provided a multiple-input multiple-output wireless communication system, in which the wireless channel of said communication system can be modeled by a finite-impulse-response (FIR) system of order integer M, comprising means for transmitting symbol sequences from a plurality (d) of users at the transmitting end of said system through the said wireless channel; means for receiving said symbol sequences transmitted from said plurality of users with receiver diversity means characterized by a diversity factor of integer N, so that N sets of sampled channel signal outputs corresponding to said symbol sequences are available; means for equalizing said received sampled channel signal outputs with intent to remove ISI wherein said equalizing means comprises means for devising a system convolution matrix A, wherein said matrix A is a generalized Sylvester matrix comprising (L+1) block rows and (M+L+1) block columns of sub-matrices each of which block is a matrix of dimension Nxd, wherein the number of rows of A, being the product of N and (L+1), is made to exceed the number of columns of A, being the product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a Nx1 vector due to system diversity; means for calculating second order statistics of said vector of sampled channel output signals o(m); means for selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

According to a further aspect of the present invention, there is provided a method of multiple-input multiple-output communication in a wireless channel, which channel can be modeled by a finite-impulse-response (FIR) system of order integer M, said method comprising transmitting symbol sequences from a plurality (d) of users at the transmitting end of said system through said wireless channel; receiving said symbol sequences transmitted from said plurality of users by a receiver with system diversity characterized by a diversity factor of integer N, so that N sets of sampled channel signal outputs corresponding to said symbol sequences are available; equalizing said received sampled channel signal outputs with intent to remove ISI wherein said equalizing comprises devising a system convolution matrix A, wherein said matrix A is a generalized Sylvester matrix comprising (L+1) block rows and (M+L+1) block columns of sub-matrices each of which block is a matrix of dimension Nxd, wherein the number of rows of A, being the product N and (L+1), is made to exceed the number of columns of A, being the product d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals which immediately precede said selected sampled channel output signal y(m), each said sampled channel output signal is a Nx1 vector due to system diversity; calculating second order statistics of said vector of sampled channel output signals o(m); selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

BRIEF DESCRIPTION OF DRAWINGS

Preferred embodiments of the present invention will now be explained, by way of examples, and with reference to the accompanying figures, in which.

DETAILED DESCRIPTION OF THE PREFERRED EMBODIMENTS

Abbreviation, Definition and Symbols

Figure 1B:
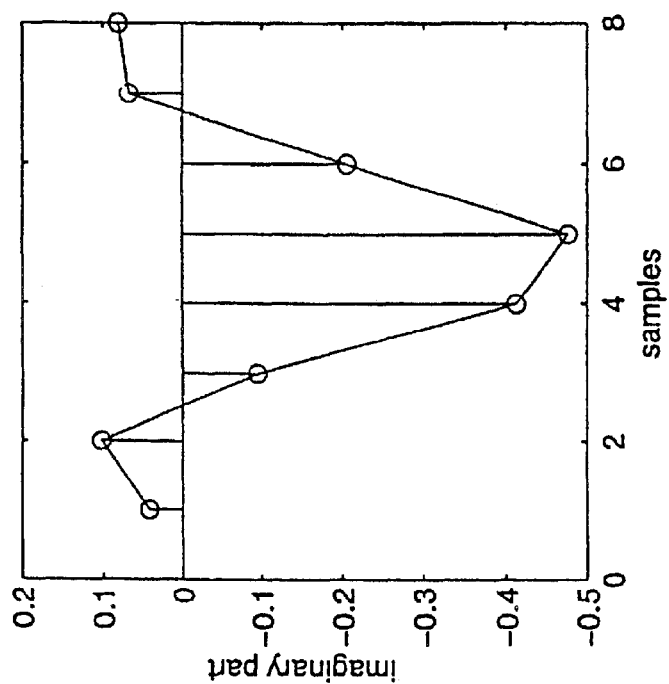
FIG. 1 shows the channel impulse response of the first simulation example under linear multi-path channels.

For easy reference, abbreviation, definitions and symbols used through out the description are set out below and have the same meaning unless otherwise specified.

| | |
|---|---|
| "A" | is a N(L + 1) × d(M + L + 1) generalized Sylvester matrix representing the transmission channel convolution matrix. |
| "[A]*" | denotes conjugate transpose of the matrix [A]; |
| "[A]#" | denotes the pseudo-inverse of the matrix [A]; |
| "[A]T" | denotes the transpose of a matrix [A]; |
| "CCI" | denotes co-channel interference; |
| "d" | is an integer representing the number of user at the inputs of a MIMO communication system; |
| "E{x}" | denotes the expectation operator of function x; |
| "FIR" | denotes finite impulse response; |
| "G" | denotes the equalizing matrix; |
| "H(n)" | is a N × d matrix representing the communication channel impulse response at delay n; |
| "$I_A$" | is a modified identity matrix defined in the next section; |
| "i.i.d." | denotes independently identical distribution; |
| "ISI" | denotes inter-symbol interference; |
| "J" | denotes a Jordan matrix more particularly described in the next section; |
| "L" | is an integer denoting system convolution matrix shaping factor defined in the next section; |
| "M" | is an integer denoting channel order; |
| "M'" | denotes M + L + 1; |
| "MIMO" | denotes multiple-input, multiple-output; |
| "N" | is an integer denoting system receiver diversity factor; |
| "o(m)" | is a vector representing collectively the m-th received and sampled channel output signal symbol sequence; |
| "s(m)" | is the vector representing collectively the m-th transmitted signal sequence at the transmission end of the transmission channel; |
| "SOS" | denotes second order statistics; |
| "y(n)" | represents the n-th sampled channel output signal symbol sequence, being $$\sum_{k=0}^{M} H(k)\alpha(n-k) + \omega(n),$$ where M is the channel order; |
| "ω(n)" | represents the output noise component vector associating with the n-th channel output signal; |
| "$\alpha_j(k)$" | represents the symbol sequence of the j-th user input; |
| "α(n)" | collective, denotes $[\alpha_1(n), \alpha_2(n), \ldots, \alpha_d(n)]^T$ |

Jordan Matrix, Modified Identity Matrix and Useful Operators

For convenience, below is a brief overview of some useful matrices which will be used throughout the following description.

J in the present context is a Jordan matrix characterized by all zero entries except the first sub-diagonal entries below the main diagonal which are all unity. It follows from the characteristics of a Jordan matrix that, $J^0=I$, and $J^{-1}=J^\P$, where I is the unity matrix. The Jordan matrix has a remarkable shifting property in that, multiplication of matrix A by the Jordan matrix $J^{-k}$, i.e., $AJ^{-k}$, has the effect of shifting A by k columns to the right, leaving the k left-most columns blank or zero. Likewise, multiplication of A by $J^k$ has the effect of shifting A by k columns to the left, leaving the k right-most columns of A blank. It is also useful to note that $J^d J^{-d}$ is an identity matrix except that its first diagonal block is zero.

$I_A$ is a modified identity matrix. This modified identity matrix is similar to an ordinary identity matrix, in which all elements in the main diagonal are unity with the remaining elements being zero, but with the last $n_1+n_2$ diagonal elements being zero. The $n_1 +n_2$ zero diagonal elements correspond to the first $n_1$ and last $n_2$ all-zero columns of the matrix A, and, because all-zero rows of $I_A$ correspond to all-zero columns of A, it follows that $A I_A=A$.

DETAILED DESCRIPTION OF THE INVENTION

Consider a linear discrete MIMO wireless communication system in which the linear dynamic wireless channel being modeled as a finite impulse response (FIR) system of order integer M. Assuming that there are a plurality (d) of users transmitting symbol signal sequences at the transmitting end of the system which will subsequently appear at the receiving end of the system. Assuming also that the system receiver has an aggregate system diversity factor of integer N so that there are available N sets of sampled channel output signals for each set of user transmitted signals. System diversity can be obtained by, for example, antenna diversity or over-sampling, and result of their diversity can be multiplied to achieve a high diversity factor. As the wireless transmission channel can be modeled by an order M FIR filter, its transmission characteristics can be fully modeled by M+1 channel transmission coefficients each of which can be represented by a N×d channel response matrix or transfer function H(k), where k is an integer between 0 and M.

Collectively representing the d input signal symbol sequences by the signal vector α(n) so that $\alpha(n)=[\alpha_1(n), \alpha_2(n), \ldots, \alpha_d(n)]^T$, and representing the N×1 i.i.d noise vector by ω(n), each of the sampled output signal sequence y(n) can be obtained by summing from k=0 to M the transmission terms H(k) α(n−k) so that the sampled channel output signal is a N×1 vector due to diversity, and y(n) is therefore given by:

$$y(n) = \sum_{k=0}^{M} H(k)\alpha(n-k) + \omega(n).$$

As the channel response H(k) generally contains both ISI and CCI terms, it will be appreciated that y(n) would be ISI free when all terms in H(k) are zero except for one particular k. To simplify derivation and without loss of generality, we shall first assume zero noise (ω(n)=0) so that:

$$y(n) = \sum_{k=0}^{M} H(k)\alpha(n-k).$$

Let $$s(m) = [\alpha(m)^T, \alpha(m-1)^T, \ldots, \alpha(m-L-M)^T]^T,$$

$$o(m) = [y(m)^T, y(m-1)^T, \ldots, y(m-L)^T]^T, \text{ and}$$

$$A = \begin{bmatrix} H(0) & H(1) & \cdots & H(M) & 0 & 0 & 0 & \cdots & 0 \\ 0 & H(0) & H(1) & \cdots & H(M) & 0 & \cdots & \cdots & 0 \\ 0 & 0 & H(0) & H(1) & \cdots & H(M) & 0 & \cdots & 0 \\ 0 & 0 & 0 & H(0) & H(1) & \cdots & H(M) & \cdots & 0 \\ 0 & 0 & \ddots & \ddots & \ddots & \ddots & \ddots & \ddots & 0 \\ 0 & 0 & 0 & 0 & 0 & \cdots & \cdots & \cdots & H(M) \end{bmatrix},$$

it follows that the vector of L+1 baud outputs of sampled channel output vector o(m) is given by o(m)=A s(m), where A is the channel convolution matrix and 0 is a N×d zero matrix. Since each H(k) is itself a N×d matrix, the channel convolution matrix A is therefore a matrix of (L+1) block rows and (M+L+1) block columns in which each block matrix element is a N×d matrix. The matrix shaping factor L is selected on the criterion that the resulting matrix A has more rows than columns, i.e., N(L+1)>d(M+L+1), or in other words, $$L > \frac{(M+1)d - N}{(N-d)}.$$

As L must be a positive integer, it follows that N must be greater than d.

When linear equalization is applied, the sampled channel output signal vector received at the receiving end of the wireless channel, o(m), will be multiplied by the equalization function G. The equalized output, e(m), is given by:

$$e(m) = G\ o(m) = G\ A\ s(m).$$

The gist of the present blind channel equalization is to recover the transmitted signal vector, s(m), from the second order statistics ("SOS") of the sampled channel output signal vector, o(m), without actual prior knowledge of either A or s(m), except that the structure and dimension of A are already known and the statistics of s(m) are available. While linear equalization is described in the preferred embodiments because of simplicity, it should be understood that nonlinear equalization methods, such as the Viterbi algorithm, will always offer better performance, though at the price of increased computation.

To enable blind recovery of the original transmitted signals from SOS of the received signal vector, o(m), it should be noted that the channel convolution matrix A must have full column rank after column-reduction. This implies that all non-zero columns of A are linearly independent. If there are indeed all zero columns in o(m), it is an indication that their corresponding input signal symbols are missing while in the process of forming s(m) and the signals are therefore not recoverable. Typically, when source signals do not span the same delays, there are all zero columns in H(0) or H(M). Note that if the above criterion is not satisfied, higher order statistics of the received signals may be required to enable satisfactory recovery.

From the structure of the above channel convolution matrix A, it would be apparent that the system matrix would be ISI-free if it has only one non-zero block column. Hence, ISI can be removed from the received signal vector, o(m) if there is provided a equalizing matrix G such that the equalized system matrix, GA, is an ISI free system matrix. In other words, the resulting equalized signal will be ISI free when all entries in GA are forced to zero except for one particular block column. Of course, input signals can not be recovered by this method if all columns in A are zero. It is therefore an important aspect of the present invention to identify and devise a suitable equalizing matrix, G.

From the structure of the matrix A, it would be observed that H(0) must be of full rank since it does not have all zero columns and it follows that all zero columns in A can only appear among the last M block columns of A. Without loss of generality, consider now a noiseless system in which:

$$o(m) = A\ s(m) = A\ I_A s(m)$$

$$= A\ s_o(m), \text{ where}$$

$$s_o(m) \triangleq \begin{bmatrix} \alpha_o(m) \\ \alpha_o(m-1) \\ \vdots \\ \alpha_o(m-L-M) \end{bmatrix}, \text{ and}$$

$I_A$ is a modified identity matrix described above. Here, A $I_A$=A due to the fact that zero rows of $I_A$ correspond to zero-columns of A, and $\alpha_o(m)$ is identical to the source input signal $\alpha(m)$ except for entries which correspond to zero columns in A. In other words, $s_o(m)$ only contain signal entries of s(m) which will ultimately appear at the output signal vector o(m) and are therefore the only signals which can be recovered from o(m).

Assuming without loss of generality that all input signal symbol sequences from the d users are un-correlated and with unit variance, it would be apparent that the expectation E{k} of the transmitted signal, s(m), and its auto-covariance R(k), which is of course second-order-statistics of the received signal, o(m), are respectively:

$$E\{k\} = E\{s(m+k)s(m)^\dagger\} = J^{kd}, \text{ and}$$

$$R(k) = E\{o(m+k)o(m)^\dagger\}$$

$$= AJ^{kd}A^\dagger, \quad \text{for } k = \ldots, -2, -1, 0, 1, 2, \ldots.$$

For a column-reduced matrix A of full rank, it would be noted that $$A^\dagger(AA^\dagger)^\# A = I_A.$$

Recalling that $J^0 = I$ and defining $P_k$, so that:

$$P_k \triangleq R(k)R(0)^\#$$

$$= AJ^{kd}A^\dagger(AA^\dagger)^\#.$$

It would be apparent that:

$$P_k o(m) = AJ^{kd}A^\dagger(AA^\dagger)^\# As(m)$$

$$= A\ J^{kd} I_A s(m)$$

$$= A\ J^{kd} s_o(m).$$

Taking into account the shifting properties of a Jordan matrix, it will be appreciated that $AJ^{kd}$ is a matrix the first (M'-k) block columns of which are the last (M'-k) columns of A with the remaining columns of A being forced to zero. By choosing k=M'-1, only the first block column of $AJ^{kd}$, which is the last block column of A, is non-zero and $P_{M'-1}$ meets the requirements of an ISI-free zero-forcing equalizer. Thus, it follows that $$P_{(M'-1)}o(m) = \begin{bmatrix} 0 \\ \vdots \\ 0 \\ H(M)\alpha_o(m) \end{bmatrix}.$$

Hence, it would be obvious that $P_{(M'-1)}$ is a matrix function based on the second order statistics of the received signal which meets the criteria of an ISI-free equalizing matrix function. Likewise, defining $Q_k$ so that:

$$Q_k \triangleq R(-k)R(0)^\#$$

$$= AJ^{-kd}A^\dagger(AA^\dagger)^\#.$$

It would be apparent that:

$$Q_k o(m) = AJ^{-kd}A^\dagger(AA^\dagger)^\# As(m)$$

$$= A\ J^{-kd} I_A s(m)$$

$$= A\ J^{-kd} s_o(m),$$

and it follows that, $$Q_{(M'-1)}o(m) = \begin{bmatrix} H(0)\alpha_o(m - M' + 1) \\ 0 \\ \vdots \\ 0 \end{bmatrix}.$$

Therefore it would be apparent that both $P(M'-1)$ and $Q_{(M'-1)}$ above are both suitable ISI-free zero-equalizing functions. However, because the value of M depends on the usually unknown channel length and that the leading and trailing elements of the impulse response $H(0)$ and $H(M)$ are usually very small because of the low pass nature of the communication channel, equalizing based on this zero-forcing equalizing method alone may not always produce the most satisfactory results.

Fixed Delay Column Anchoring

To alleviate shortcomings of the above second order equalizing functions, $P_{(M'-1)}$ and $Q_{(M'-1)}$, a second preferred embodiment of the present invention will now be described. In this preferred embodiment, zero-forcing equalization is achieved by identifying SOS based algorithms/operators which have the effect of selectively choosing a suitable block column in the channel convolution matrix A to perform equalization, so that equalization does not have to solely depend on the leading or trailing response terms $H(0)$ and $H(M)$ of the channel impulse response. Recalling from above that:

$$P_{(k-1)}o(m) = A J^{(k-1)d} s_o(m),$$

and $$P_k o(m-1) = A J^{kd} s_o(m-1)),$$

it will be observed that:

$$P_{(k-1)}o(m) - P_k o(m-1) = A(J^{(k-1)d} s_o(m) - J^{kd} s_o(m-1)).$$

Recalling the properties of the matrices J and $s_o(m)$ and noting from above that:

$$J^{(k-1)d} s_o(m) = \begin{bmatrix} 0_{(k-1)d} \\ \alpha_o(m) \\ \alpha_o(m-1) \\ \vdots \\ \alpha_o(m - M' + k) \end{bmatrix}, \text{ and}$$

$$J^{kd} s_o(m-1) = \begin{bmatrix} 0_{(k-1)d} \\ 0_d \\ \alpha_o(m-1) \\ \vdots \\ \alpha_o(m - M' + k) \end{bmatrix},$$

where $0_{kd}$ is a $kd \times 1$ zero vector, it will be observed that:

$$P_{(k-1)}o(m) - P_k o(m-1) = A \begin{bmatrix} 0_{(k-1)d} \\ \alpha_o(m) \\ 0_{(M'-k)d} \end{bmatrix},$$

$$= h(k)\alpha_o(m), \text{ where}$$

$$h(k) = \begin{bmatrix} H(k-1) \\ H(k-1) \\ \vdots \\ H(k-L-1) \end{bmatrix}$$

for $n<0$ or $n>M$ and since $J^{(k-1)d} s_o(m) - J^{kd} s_o(m-1) =$ $$J^{(k-1)d} s_o(m) - J^{kd} s_o(m-1) = \begin{bmatrix} 0_{(k-1)d} \\ \alpha_o(m) \\ 0_{(M'-k)d} \end{bmatrix}.$$

Hence, it will be observed that the k-th block column of A has been successfully anchored by the above scheme of operation while all remaining block columns of A have been forced to zero. Without loss of generality, it will be appreciated that any suitable block column $h(k)$ of A can be selectively anchored to obtain the appropriate ISI-free output signal $e(m)$. Similarly, defining another second order equalizing function:

$$Q_{(k-1)}o(m-1) - Q_k o(m) = A[J^{(k-1)d} s_o(m-1) - J^{kd} s_o(m)]$$

$$= h(M' - k + 1)\alpha_o(m - M'),$$

it will follow that the $(M'-k+1)$-th block column of A is now selectively anchored to achieve similar results. Note that in both cases, the equalizer outputs have a zero delay and the only differences between these two cases are the direction of shift of the block columns of A. Thus, the above equalizing functions provide ISI-free equalization by selectively anchoring a block column of A based on second order statistical functions $P_{(k-1)}$ and $P_k$ or $(Q_{(k-1)}$ and $Q_k)$ of the received signals with zero (or maximum) delay. It would be appreciated that some elements in $\alpha_o(m)$ and $\alpha_o(m-M')$ may be zero in this equalizing scheme, thereby making source separation easier. On the other hand, however, the presence of zero elements in $\alpha_o(m)$ and $\alpha_o(m-M')$ may imply that all source signals cannot be extracted if there are all zero columns in $H(0)$ or $H(M)$.

Selectable Column Anchoring

To alleviate the shortcomings associated with the above preferred embodiments, there is now described a third preferred embodiment of the present invention. Consider:

$$J^{kd} J^{-kd} = \begin{bmatrix} 0_{kd \times kd} & 0_{kd \times (M'-k)d} \\ 0_{(M'-k)d \times kd} & I_{(M'-k)d} \end{bmatrix},$$

$$J^{-kd} J^{-kd} = \begin{bmatrix} I_{(M'-k)d} & 0_{(M'-k)d \times kd} \\ 0_{kd \times (M'-k)} & 0_{kd \times kd} \end{bmatrix},$$

where $0_{n \times m}$ is an zero matrix of dimension $n \times m$ and $I_{(m'-k)d}$ is an identity matrix of dimension $(M'-k)d$. From the properties of $I_A$, it will be observed that:

$$I_A J^{kd}(I_A - J^d I_A J^{-d}) J^{-kd} = I_A J^{kd}(I - J^d J^{-d}) J^{-kd}.$$

It allows that:

$$J^{kd}(I - J^d J^{-d}) J^{-kd} = \begin{bmatrix} 0_{kd \times kd} & 0_{kd \times kd} & 0_{kd \times (M'-k-1)d} \\ 0_{d \times kd} & I_d & 0_{d \times (M'-k-1)d} \\ 0_{(M'-k-1)d \times kd} & 0_{(M'-k-1)d \times d} & 0_{(M'-k-1)d \times (M'-k-1)d} \end{bmatrix}$$

is an all zero matrix except with the unity block matrix, $I_d$, at its $(k+1, k+1)$-th block entry. From the properties of $J^d J^{-d}$ described above, it will be appreciated that:

$$A(J^{kd}J^{-kd}-J^{(k-1)d}J^{-(k+1)d})=[0_{N(L+1)\times kd}h(k+1)0_{N(L+1)\times(M'-k-1)d}],$$

where, again, h(k) is the k-th block column of A. Now observe that:

$$P_kQ_k = A J^{kd} I_A J^{-kd} A^\dagger (A A^\dagger)^\#$$
$$= A I_A J^{kd} I_A J^{-kd} I_A A^\dagger (A A^\dagger)^\#, \text{ and that}$$

$$P_kQ_k - P_{k+1}Q_{k+1} = A I_A (J^{kd} I_A J^{-kd} - J^{(k+1)d} I_A J^{-(k+1)d})$$
$$I_A A^\dagger (A A^\dagger)^\#$$
$$= A I_A J^{kd} (I_A - J^d I_A J^{-d}) J^{-kd} I_A A^\dagger (A A^\dagger)^\#$$
$$= A J^{kd} (I - J^d J^{-d}) J^{-kd} A^\dagger (A A^\dagger)^\#$$
$$= A \begin{bmatrix} 0_{kd\times kd} & 0_{kd\times kd} & 0_{kd\times(M'-k-1)d} \\ 0_{d\times kd} & I_d & 0_{d\times(M'-k-1)d} \\ 0_{(M'-k-1)d\times kd} & 0_{(M'-k-1)d\times d} & 0_{(M'-k-1)d\times(M'-k-1)d} \end{bmatrix}$$
$$A^\dagger (A A^\dagger)^\#.$$

It follows that:

$$(P_kQ_k - P_{k+1}Q_{k+1})o(m) = [0_{N(L+1)\times kd} \quad h(k+1) \quad 0_{N(L+1)\times(M'-k-1)d}]I_A s(m)$$
$$= [0_{N(L+1)\times kd} \quad h(k+1) \quad 0_{N(L+1)\times(M'-k-1)d}]s_o(m)$$
$$= h(k+1)\alpha_o(m-k)$$
$$= h(k+1)\alpha(m-k).$$

The last equality holds because of corresponding zeroes in h(k+1) and $\alpha_o$(m−k) and it will be apparent that the equalizing function, G, is equal to $(P_kQ_k-P_{k+1}Q_{k+1})$ in this case. It should also be noted in this case that the output delay can be selected according to the anchoring constant k. Likewise, it follows that:

$$(Q_{k-1}P_{k-1} - Q_kP_k)o(m) = h(M'-k+1)\alpha_o(m-M'+k)$$
$$= h(M'-k+1)\alpha(m-M'+k), \text{ and}$$
$$G = (Q_{k-1}P_{k-1} - Q_kP_k)$$

in this case is therefore another appropriate equalizing function meeting the aforementioned ISI-free equalization criterion. From the properties of $P_k$ and $Q_k$, it also follows that:

$$(P_kQ_k)^n = P_kQ_k,$$
$$(P_kQ_k-P_{k+1}Q_{k+1})^n = P_kQ_k-P_{k+1}Q_{k+1}.$$

Hence, for any positive integer $n_1$, $n_2$ $n_3$, the generalized functions:

$$[(P_kQ_k)^{n_1}-(P_{k+1}Q_{k+1})^{n_2}]^{n_3}o(m)=h(k)\alpha(m-k+1),$$

and $$[(Q_{k-1}P_{k-1})^{n_1}-(Q_kP_k)^{n_3}]o(m)=h(M'-k1)\alpha(m-M'+k)$$

would all produce ISI-free equalization. Hence, it will be appreciated that the algorithms described in this section can extract source signals with substantial ISI elimination so long as the anchored columns are not all zero.

Noise Consideration

The above has been described with the assumption of a noise-less channel. To take into account the effect of additive channel noise, it would be appreciated that the noise level may be subtracted directly from the auto-covariance matrices when the noise level is known. When the noise level is un-known, it can be estimated by singular value decomposition ("SVD") of R(0). However, it is noted that removal of noise contribution by subtraction often results in poorer performance and is not recommended. Alternatively, the rank and pseudo-inverse of R(0) may be utilized in noise reduction.

Final Output Stage

In the preferred embodiments described above, ISI-free equalization schemes which are based on receiver diversity have been introduced. As N(L+1) multiple outputs will be available as a result of diversity and because the corruption of the various received signals by additive white noise will be different. It is therefore necessary to determine an appropriate scheme by which the final signal outputs can be determined. Below are examples of some suitable schemes.

Maximum Likelihood Estimate

Recall that $$o(m) = A s(m) + \omega(n), \text{ and}$$
$$e(m) = G o(m) \quad = G A s(m)$$
$$= h(k+1)\alpha(m-k) + G \omega(n), \text{ for a pre-selected column } k, \text{ where}$$
$$G = P_kQ_k - P_{k+1}Q_{k+1} \quad \text{from the third embodiment above.}$$

For white Gaussian additive noise, the maximum likelihood estimate of the input symbol sequence is:

$$\alpha(m-k) = \frac{1}{\|h(k+1)\|^2} h(k+1)^\dagger (G G^\dagger)^\# e(m), \text{ and}$$

h(k) can be estimated from the covariance matrix of e(m) where $$E\{e(m+k)e(m)^\dagger\}=h(k+1)h(k+1)^\dagger+\sigma^2_\omega G G^\dagger,$$

where all noise components are assumed to have the same variance $\sigma^2_{107}$. Since $$G\ G^\dagger = \alpha_{kk} h(k+1) h(k+1)^\dagger,$$

where $\alpha_{kk}$ is the (k,k) entries of . If $\alpha_{kk}$ is non-zero, h(k+1) can be identified as the eigen-vector of G G corresponding to the largest eigen-value. Otherwise, the covariance matrix:

$$R_e = (1+\sigma^2_\omega \alpha_{kk}) h(k+1) h(k+1)^\dagger$$

which is a rank one matrix spanned by h(k) would have to be formed. Note that h(k) is the dominant vector in the space of $R_e$ and can be determined as the eigen-vector of $R_e$ associated with the largest eigen value. Also, as $R_e$ is rank one, the maximum likelihood estimate can be simplified as:

$$\alpha(m-k) = h(k+1)^\dagger e(m).$$

This approach is more appropriate for the third embodiment as the estimate will become more complicated when applied in the second embodiment, unless the channel noise is very weak.

Single Output Selection

A simpler scheme for final output stage signal processing is to select among the various equalized outputs of e(m) one which gives the best SNR. This can be done, for example, by considering that:

$$\frac{E\{|e_i|m|^2\}}{|g_{i,k}|^2} = \sigma^2_\omega (SNR_i + 1),$$

where $g_{i,k}$ is the (i,k)-th component of matrix G, $h_i$ is the i-th component of h(k), $SNR_i$ is the SNR of the i-th component of e(m) and $$SNR_i = \sigma^{-2}_\omega \frac{|h_i|^2}{|g_{i,k}|^2}.$$

Thus the output $e_i(m)$ which gives the maximum value of $$\frac{E\{|e_i|m|^2\}}{|g_{i,k}|^2}$$

would be the one with the maximum SNR suitable for output selection.

Maximum Power Column Selection

A further scheme of final output selection is to identify the equalized output with the 10 maximum energy content. Because of the low-pass nature of a typical wireless channel, middle columns of A with large norms usually provide the strongest signal contents and should be selected. In fact, the M-th block column of A, where M is the estimated channel length, should be selected even without prior knowledge of A. Alternatively, a plurality of equalized outputs may be obtained by multiple column anchoring and the one with strongest signal output would be selected. This method is useful for both the second and third embodiments. Furthermore, by choosing different delay constant k, there is no need to recompute $R(0)^\#$ for each delay column and the increase in computational costs is therefor modest.

SIMULATION EXAMPLES

1. Linear Multi-path Channels

Figure 1A:
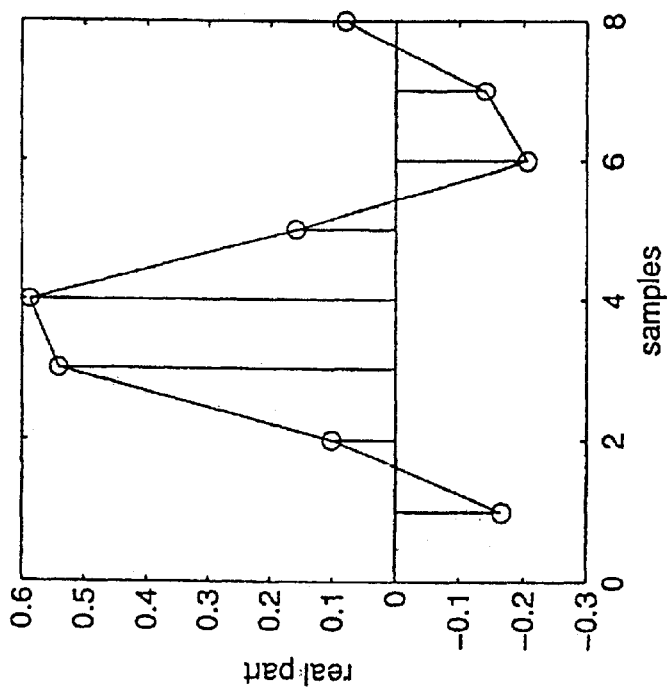
Figure 2B:
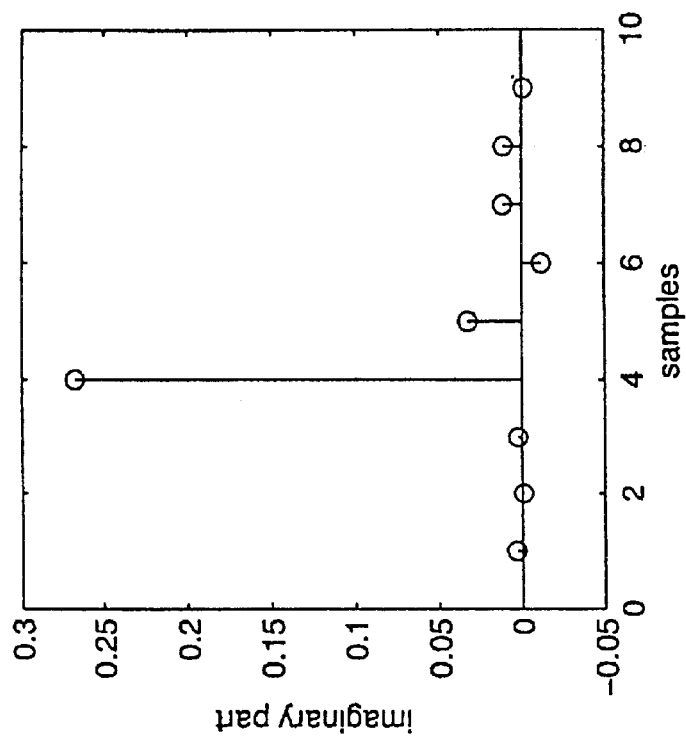
FIG. 2 shows the system impulse response of first example of FIG. 1 after equalization.
Figure 2A:
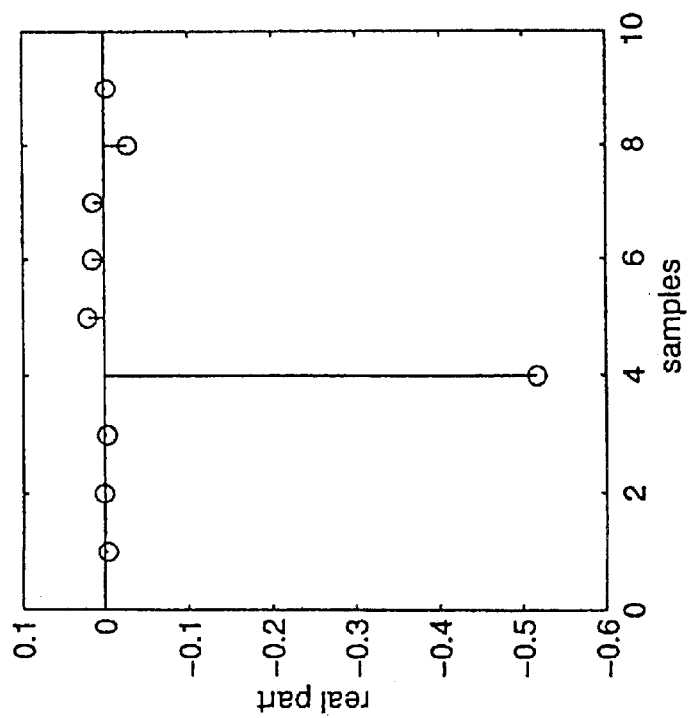
Figure 3B:
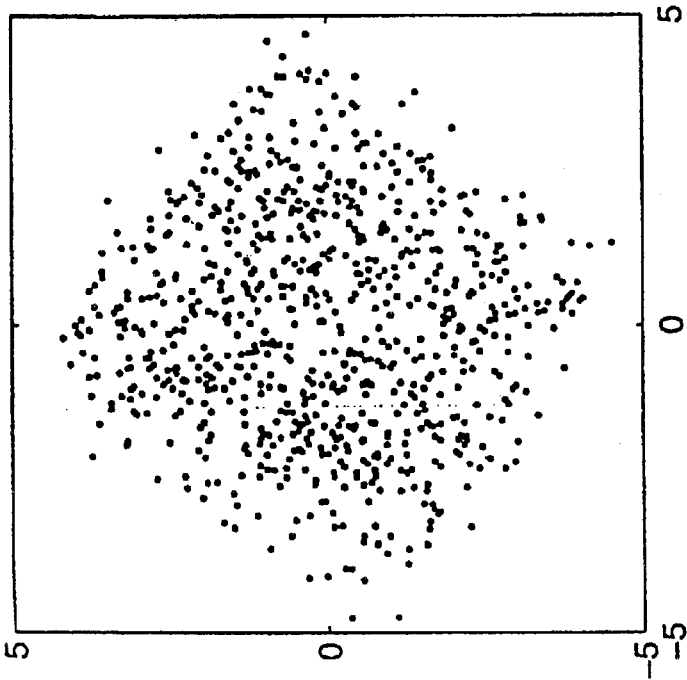
FIGS. 3 and 4 show the eye diagrams of the first simulation example before and after equalization for SNR=25 dB.
Figure 3A:
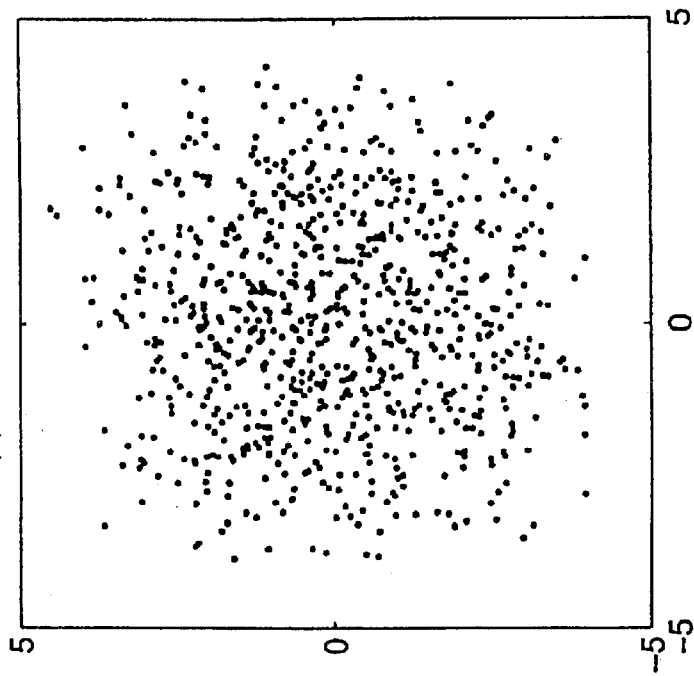
Figure 4:
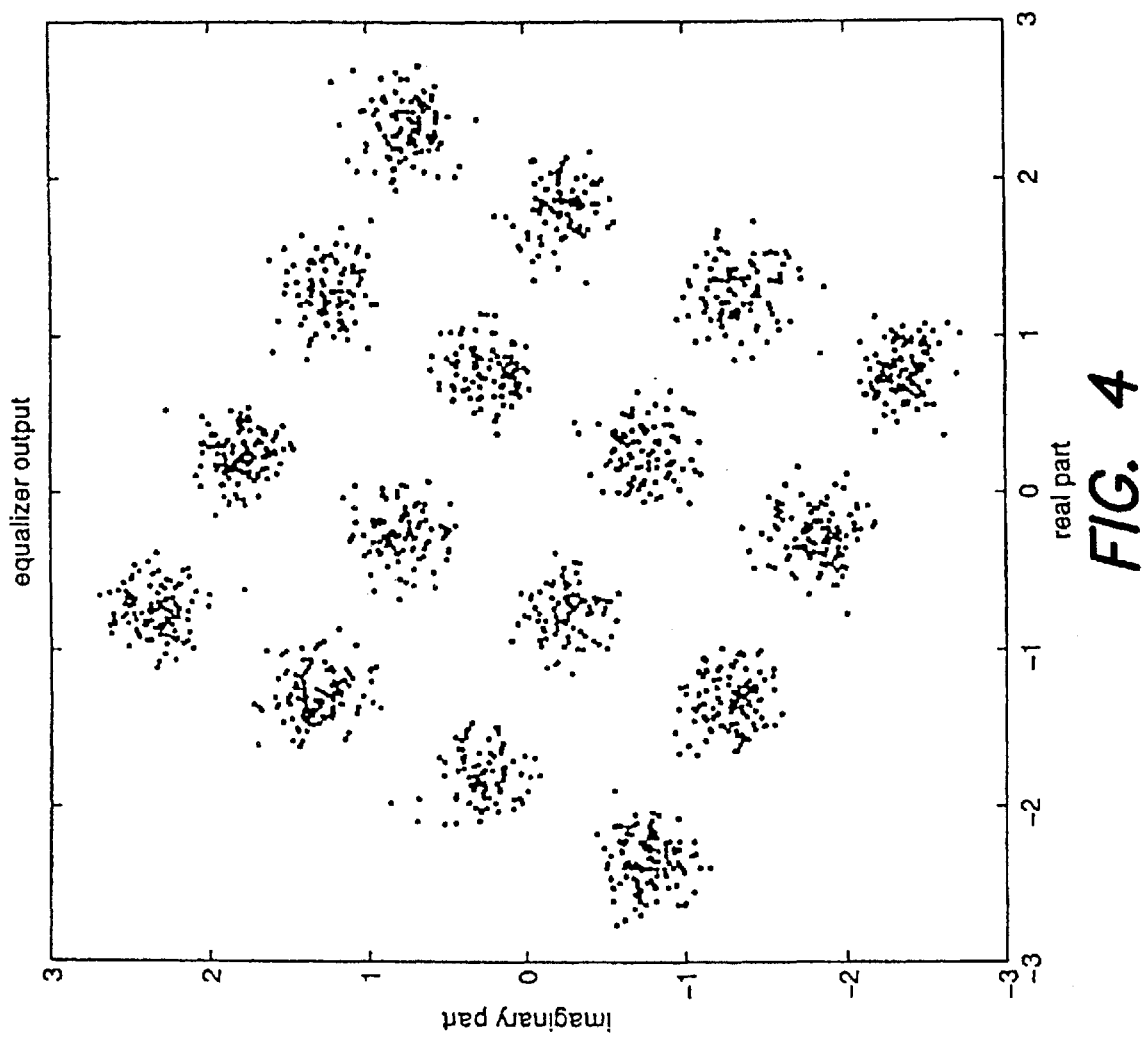
Figure 5:
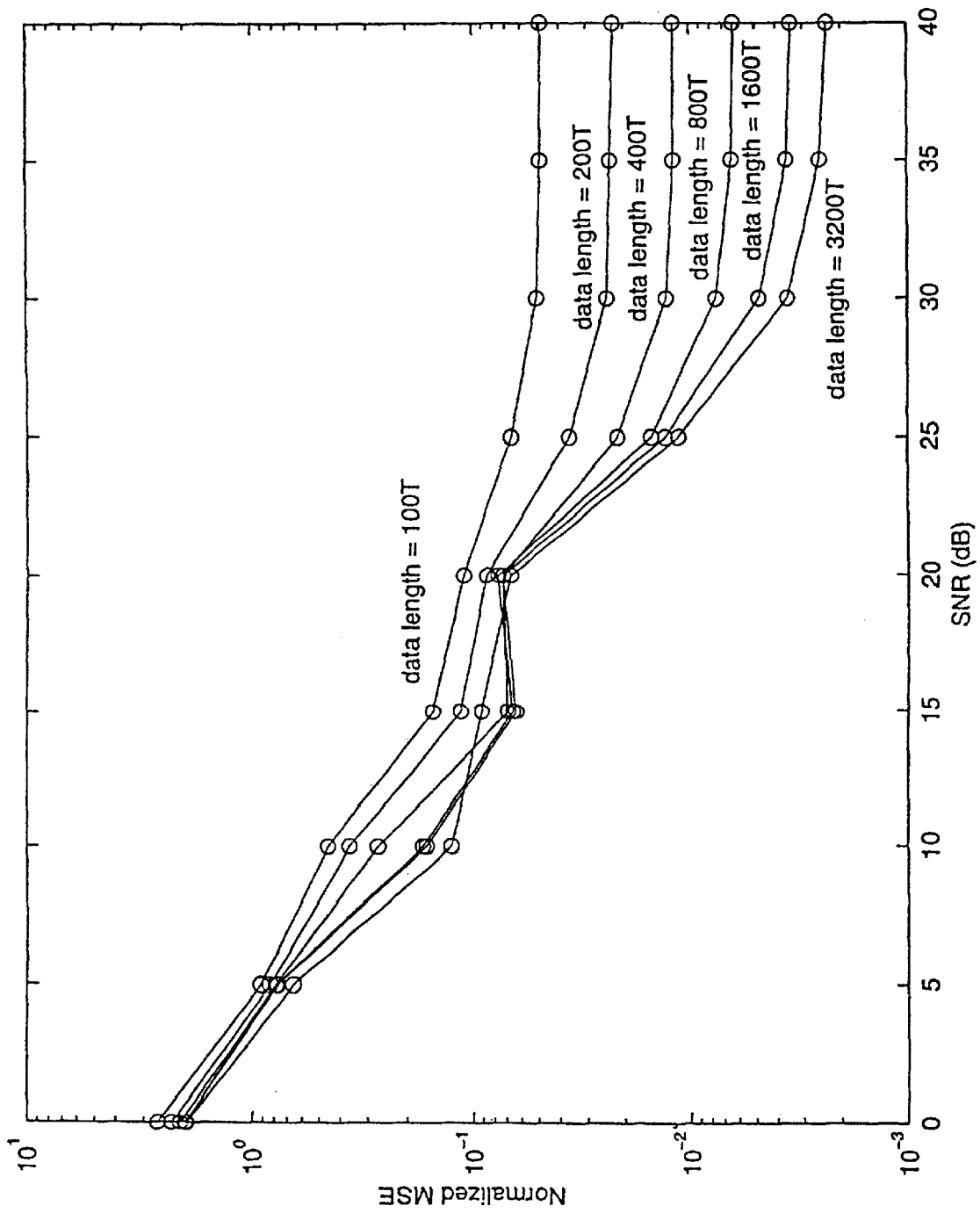
FIG. 5 shows the received signals as obtained by exhaustive computation by averaging over 100 Monte Carlo simulations for the first simulation.

FIG. 1 is a simulation result applying the third embodiment and using the maximum likelihood estimate with L=5 and k=4, i.e., the 4-th column of the channel convolution matrix will be anchored, with unknown channel order. In this simulation, the channel is assumed to be a two-ray multi-path with the following channel impulse response (see FIG. 1):

$$h(t) = p(t) - 0.5(1+j) p(t-T/3)$$

where:

T is the baud period;

p(t) a raised-cosine pulse with $\beta 0.1$ and truncated to 4T. The simulation results as shown in FIGS. 3 and 4 demonstrate that this scheme is particular effective when SNR is above 15 dB, even when the data length is as short as 100T.

2. GSM System

For simulation of a GSM transmission environment, the de-rotation method suggested by Alle-Jan van der Veen and A. Paulraj in their paper "Singular Value Analysis of Space-Time Equalization in the GSM Mobile System," (Proceedings of IEEE ICASSP, 1073–1076, Atlanta, May, 1996) will be adopted. In this approach, the real and imaginary parts of the de-rotated signal is taken to generate two sub-channel outputs which would then subject to the above-mentioned column-anchoring equalization methods.

Figure 6:
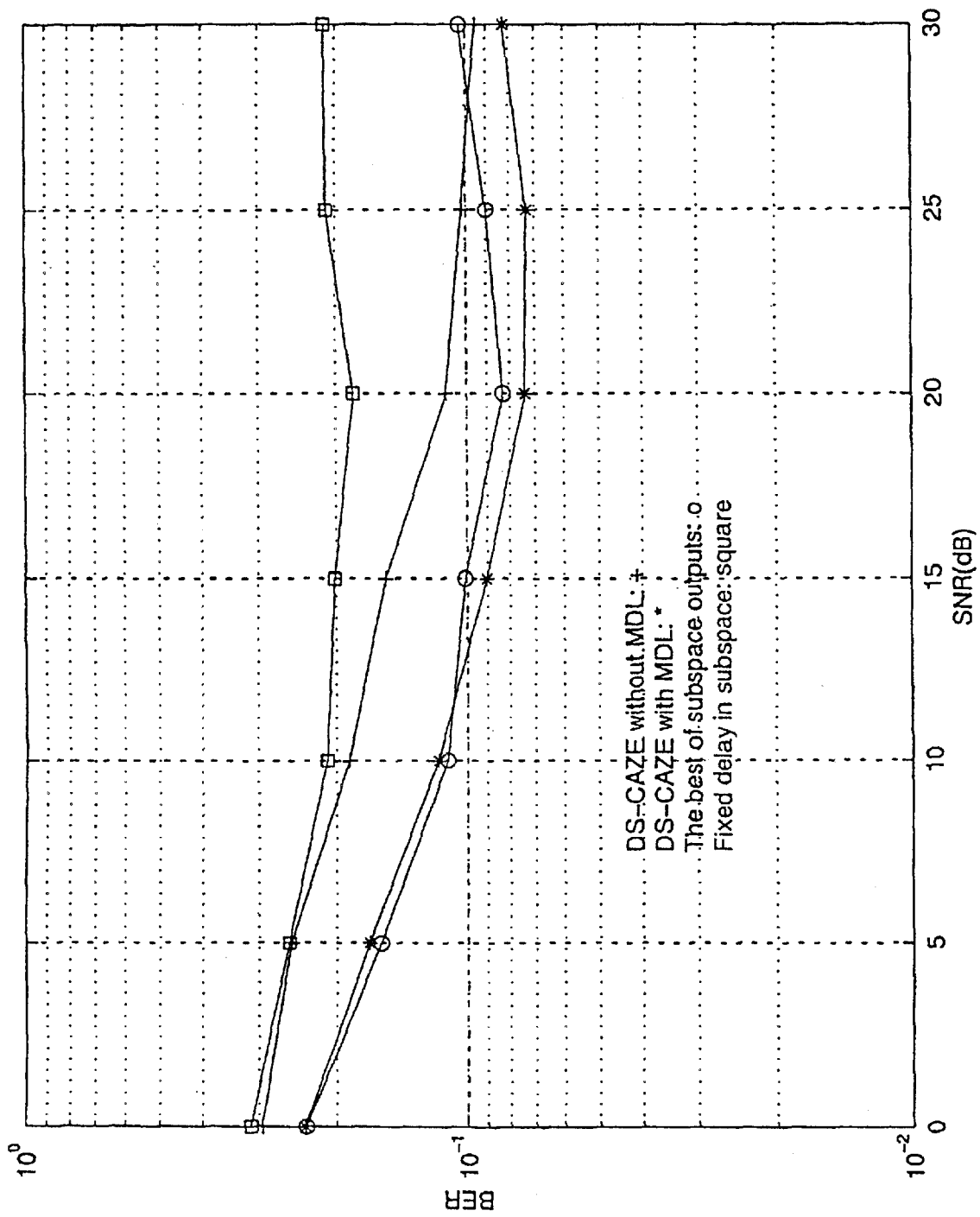
FIG. 6 and 7 compare the simulated bit-error-rates (BER) of recovered signals obtained by the present invention and a conventional method under the GSM environment respectively for "bad urban" and "hilly terrain" conditions.
Figure 7:
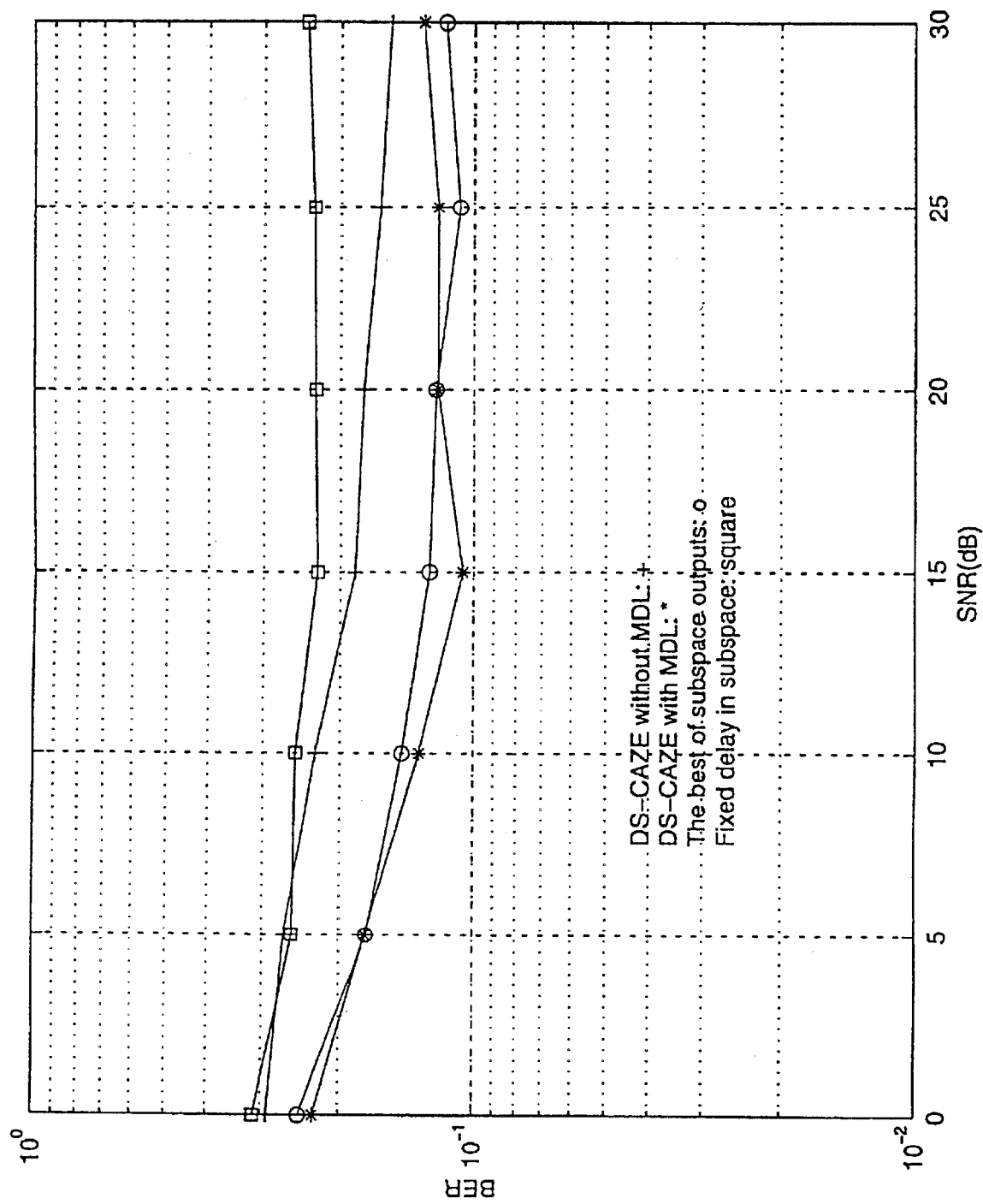
Figure 8:
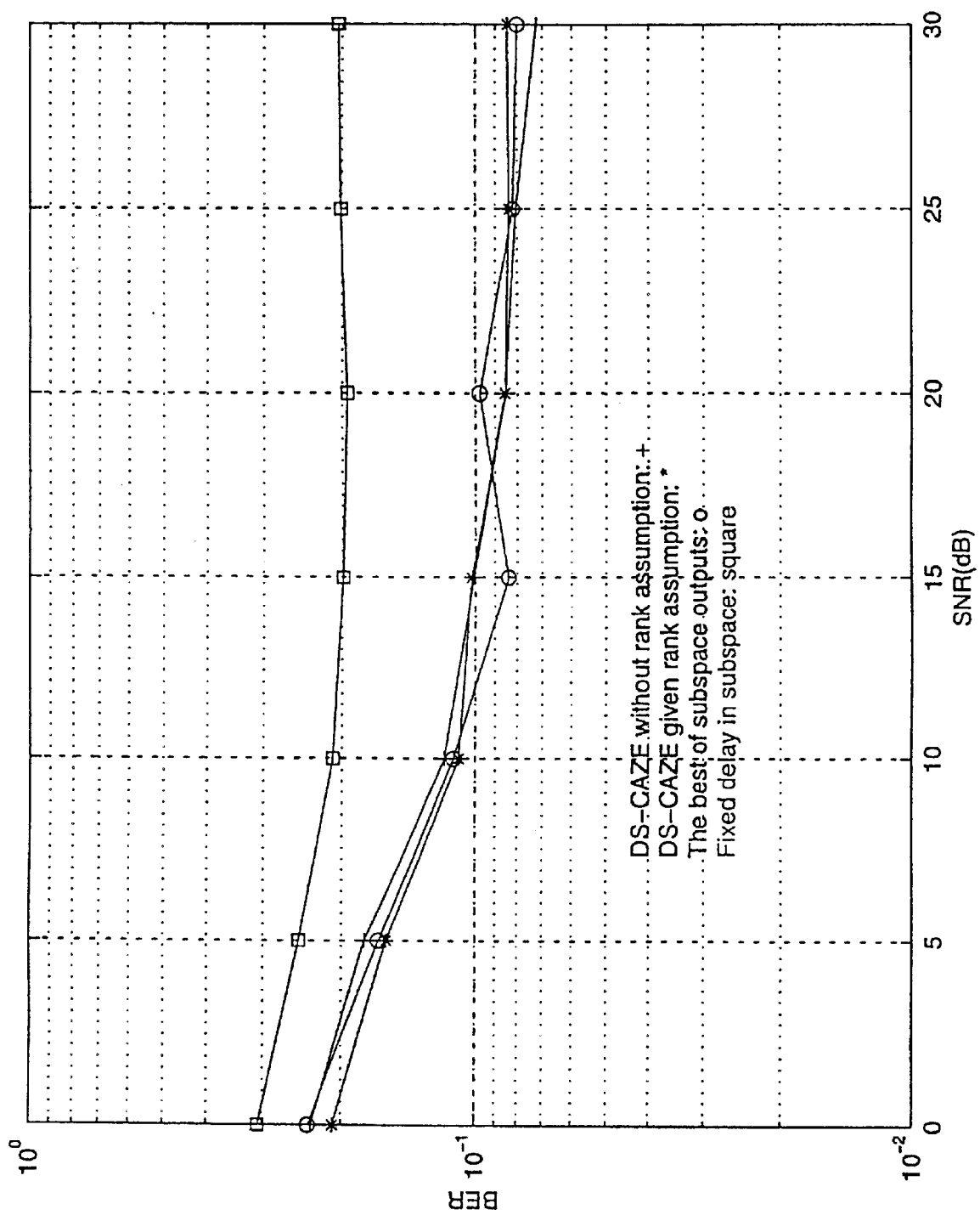
FIGS. 8 to 11 show the BER comparisons of simulation results under the GSM environment and using the present invention and conventional equalization method with varying channel order M.
Figure 9:
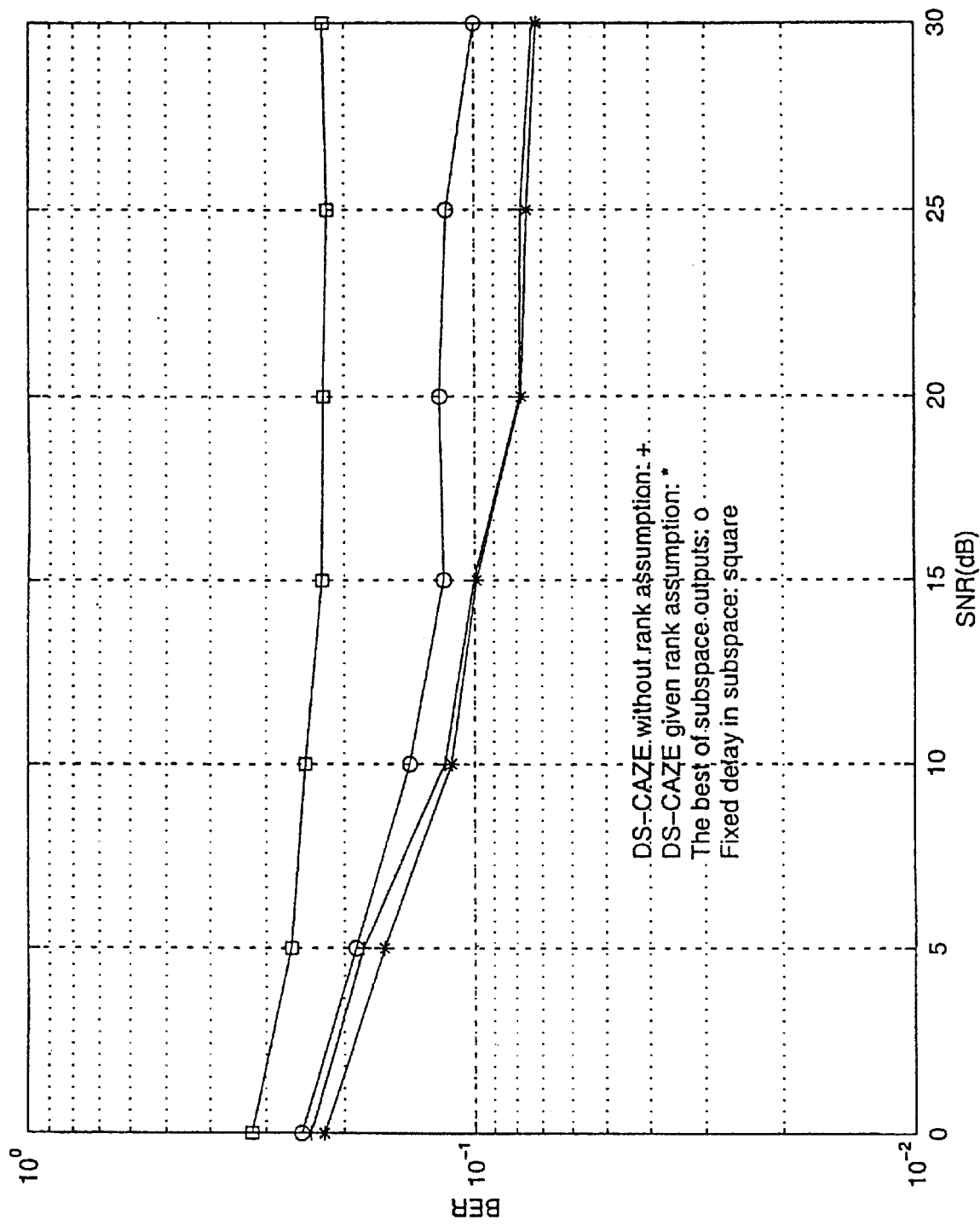
Figure 10:
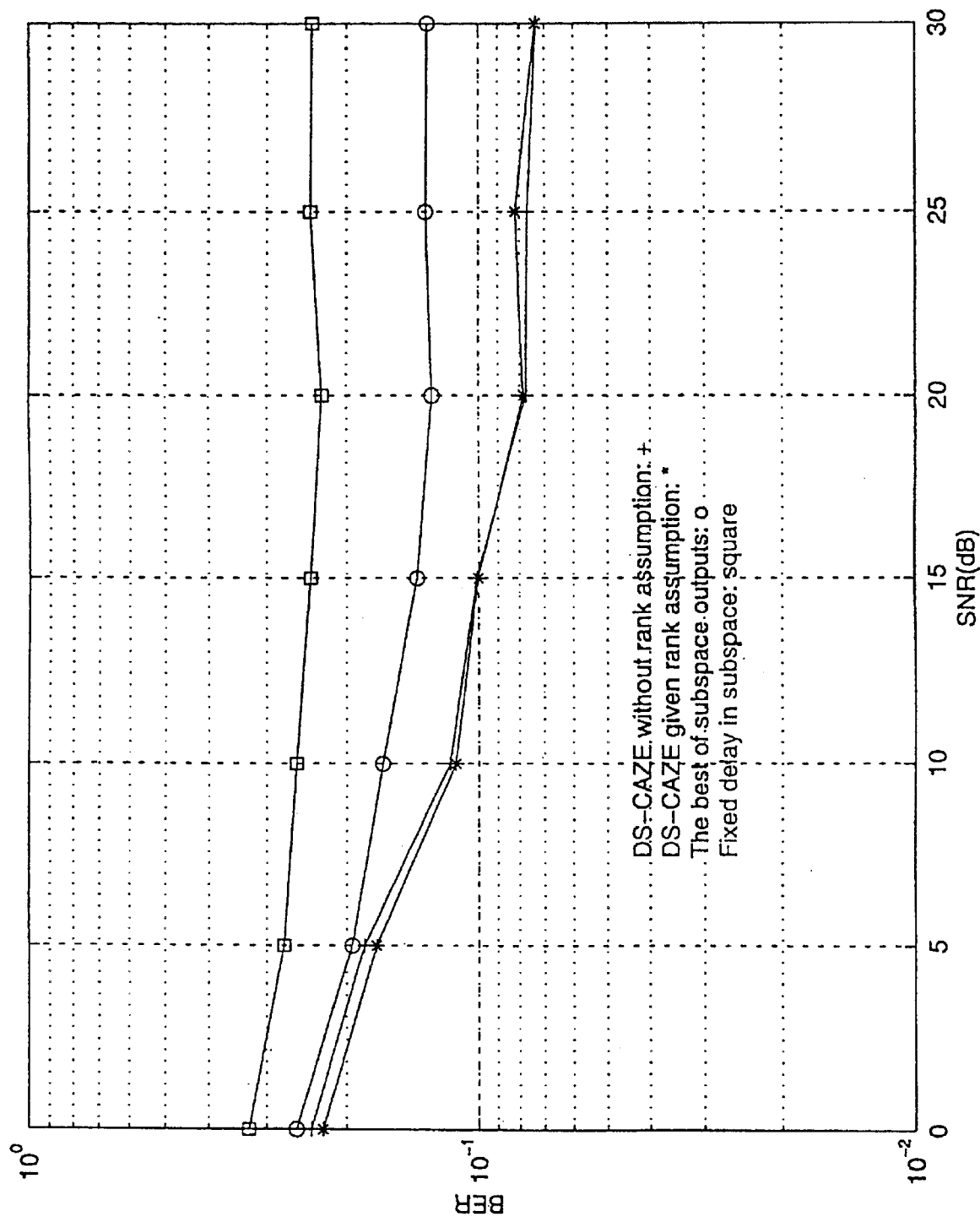
Figure 11:
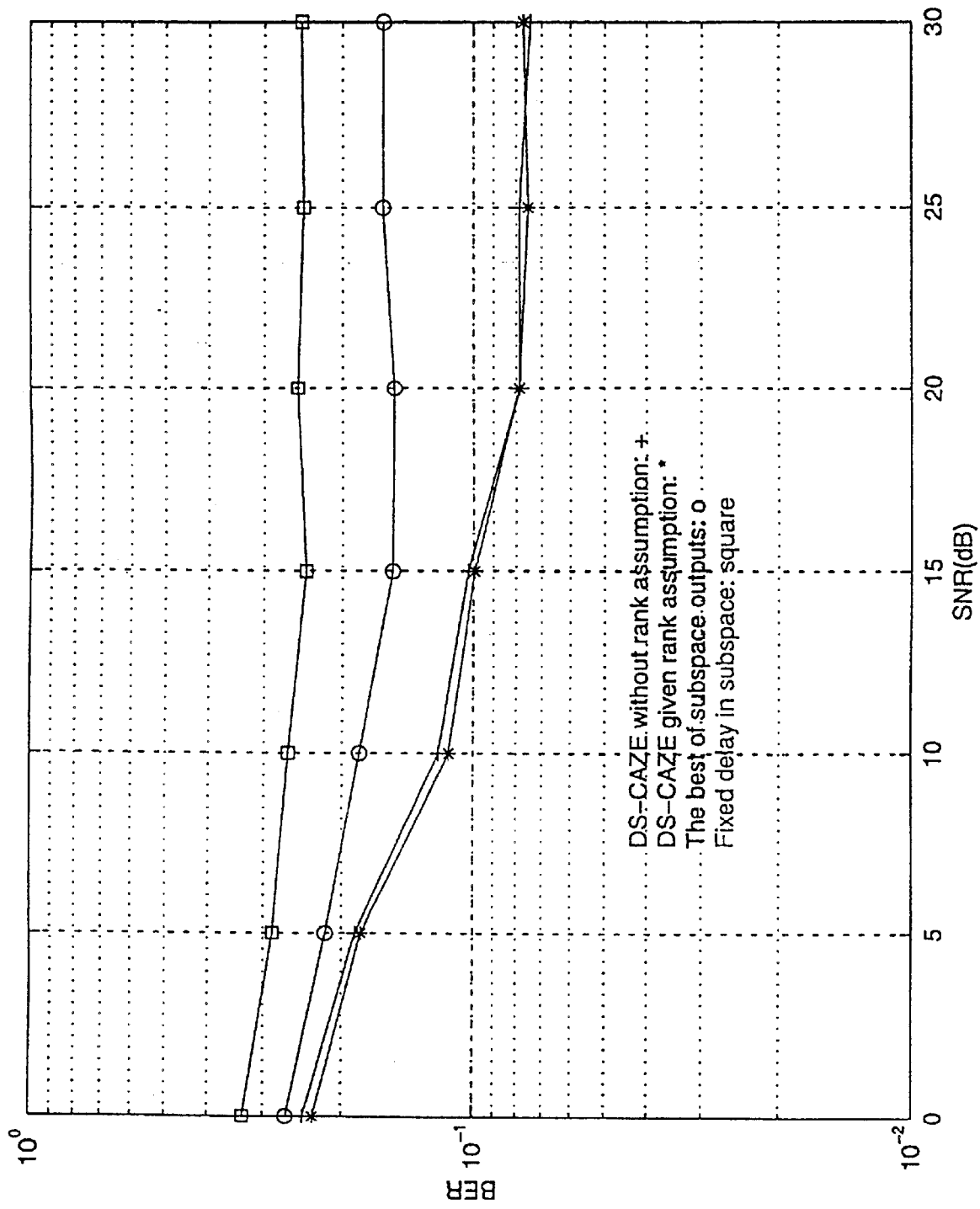

Assuming in this simulation of GSM system that L=9, i.e., the data length being 10 bauds, the impulse response is over-sampled by a factor of 16, the receiver anti-aliasing filter is a root-raised cosine with roll-off factor 0.1 and bit timing is based on maximum sampling power at the receiver filter output. The sampled data then de-rotated, separated into two sub-channels and processed by the equalization method described in the third embodiment. It is clear from the BER comparison shown in FIGS. 6 (Bad Urban) and 7 (Hilly Terrain) that the performance of the present proposed equalization methods out-performs the result obtained from the well-known "Subspace Method" under similar test conditions.

Furthermore, simulations with channel orders varied from M=3 to 6 are provided so that the sensitivity of the present invention to errors in channel order estimate can be evaluated. L is chosen according to the channel order estimates so that A has minimum size as an rectangular convolution matrix and the equalized output with the highest energy is selected as the final output.

From the comparison of BERs in FIGS. 8 to 11, it can be seen that the present invention consistently provides a superior BER and that the present method is less sensitive to variation in channel order estimates.

Thus, the present invention proposed a method in which any d columns in the channel convolution matrix can be selected for signal recovery. It is also shown in the present invention that simple and effective "column-anchored zero-forcing" blind equalization for MIMO system can be achieved based only on second order statistics of the channel output signals. The present invention does not rely on channel order estimate and are less sensitive to errors in the channel matrix rank estimate, which is one of the major shortcomings of conventional SOS methods. It should be noted that the preferred embodiments and the simulation examples are merely provided to assist understanding of the present invention and do not in any event limit the scope of the present invention which is generally described hereinbefore. Of course, it would be obvious to persons skilled in the art to employ other equalization methods based on second order statistics of the received signals to achieve ISI-free equalization.

What is claimed is:

1. A signal equalization method for a multiple-input, multiple-output (MIMO) wireless communication system in which a wireless channel of said communication system being modeled by a finite-impulse-response (FIR) system of order integer M, said communication system is provided with system diversity having a receiver diversity factor of integer N, said equalization method includes the steps of:

devising a system convolution matrix A, wherein said matrix A is a generalized Sylvester matrix comprising (L+1) block rows and (M+L+1) block columns of sub-matrices each of which block is a matrix of dimension N×d, wherein the number of rows of A, being the product of N and (L+1), is made to exceed the number of columns of A, being the product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a N×1 vector due to system diversity;

calculating second order statistics of said vector of sampled channel output signals o(m);

selecting suitable linear equalizing functions (G) derived from said second order statistics of said sampled channel output signals; and algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

2. The equalization method according to claim 1 wherein said second order statistics are the auto-covariance, R(k), where k is a natural number, of the received and sampled channel output signals, o(m).

3. The equalization method according to claim 1 wherein said suitable linear function G is obtained by multiplying the auto-covariance R(k) of the received and sampled channel output signals, o(m), by the pseudo-inverse of the auto-covariance of R(0) and is equal to $R(k)R(0)^{\#}$, said equalized received signals are then obtained by multiplying said sampled channel output signals, o(m), by said linear function with k=M+L.

4. The equalization method according to claim 1 wherein said suitable linear function is obtained by multiplying the auto-covariance R(−k) by the pseudo-inverse of the auto-covariance of R(0) and is equal to $R(-k)R(0)^{\#}$, said equalized received signals are obtained by multiplying said received sampled channel output signals, o(m), by said linear function with k=M+L.

5. The equalization method according to claim 1 wherein said suitable linear function G is of the form $G=[(P_k Q_k)^{n_1} - (P_{k+1} Q_{k+1})^{n_2}]^{n_3}$ where $P_k = R(k)R(0)^{\#}$, $Q_k = R(-k)R(0)^{\#}$, k being a real integer and $n_1, n_2, n_2$ being any positive integers.

6. The equalization method according to claim 1 wherein said suitable linear function G is of the form $G=[(Q_{k-1} P_{k-1})^{n_1} - (Q_k P_k)^{n_2}]^{n_3}$ where $P_k = R(k)R(0)^{\#}$, $Q_k = R(-k)R(0)^{\#}$, k being a real integer and $n_1, n_2, n_2$ being any positive integers.

7. The equalization method according to claim 1 wherein said suitable linear function $G = P_k Q_k - P_{k+1} Q_{k+1}$, where $P_k = R(k)R(0)^{\#}$ and $Q_k = R(-k)R(0)^{\#}$, k being a real integer.

8. The equalization method according to claim 1 wherein said suitable linear function G is of the form $=(Q_{k-1} P_{k-1} - Q_k P_k)$, where $P_k = R(k)R(0)^{\#}$ and $Q_k = R(-k)R(0)^{\#}$, k being a real integer.

9. The equalization method according to claim 1 wherein selection of the equalized received signal from the various diversity outputs for final output is based on the maximum likelihood estimate of the received signals.

10. The equalization method according to claim 1 wherein selection of the equalized received signal from the various diversity outputs for final output is based on the best signal-to-noise ratio (SNR) of the received signals.

11. The equalization method according to claim 1 wherein selection of the equalized received signal from the various diversity outputs for final output is based on the selection of a block column of A which gives the strongest signal contents.

12. An equalizer of a receiver for a multiple-input, multiple-output (MIMO) wireless communication system in which the wireless channel of said communication system being modeled by a finite-impulse-response (FIR) system of order integer M, said communication system is provided with system diversity having a receiver diversity factor of integer N, said equalizer includes:

means for devising a system convolution matrix A, wherein said matrix A is a generalized Sylvester matrix comprising (L+1) block rows and (M+L+1) block columns of sub-matrices each of which block is a matrix of dimension N×d, wherein the number of rows of A, being the product of N and (L+1), is made to exceed the number of columns of A, being the product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a N×1 vector due to system diversity;

means for calculating second order statistics of said vector of sampled channel output signals o(m);

means for selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

13. An equalizer according to claim 12, wherein said second order statistics are the auto-covariance, R(k), where k is a natural number, of the received and sampled channel output signals, o(m).

14. An equalizer according to claim 12, wherein said suitable linear function G is obtained by multiplying the auto-covariance R(k) of the received and sampled channel output signals, o(m), by the pseudo-inverse of the auto-covariance of R(0) and is equal to $R(k)R(0)^{\#}$, said equalized received signals are then obtained by multiplying said sampled channel output signals, o(m), by said linear function with k=M+L.

15. An equalizer according to claim 12, wherein said suitable linear function is obtained by multiplying the auto-covariance R(−k) by the pseudo-inverse of the auto-covariance of R(0) and is equal to $R(-k)R(0)^{\#}$, said equalized received signals are obtained by multiplying said received sampled channel output signals, o(m), by said linear function with k=M+L.

16. An equalizer according to claim 12, wherein said suitable linear function G is of the form $G=[(P_k Q_k)^{n_1}-(P_{k+1} Q_{k+1})^{n_2}]^{n_3}$ where $P_k=R(k)R(0)^{\#}$, $Q_k=R(-k)R(0)^{\#}$, k being a real integer and $n_1$, $n_2$, $n_2$ being any positive integers.

17. An equalizer according to claim 12, wherein said suitable linear function G is of the form $G=[(Q_{k-1} P_{k-1})^{n_1}-(Q_k P_k)^{n_2}]^{n_3}$ where $P_k=R(k)R(0)^{\#}$, $Q_k=R(-k)R(0)^{\#}$, k being a real integer and $n_1$, $n_2$, $n_2$ being any positive integers.

18. An equalizer according to claim 12, wherein said suitable linear function $G=P_k Q_k - P_{k+1} Q_{k+1}$, where $P_k=R(k)R(0)^{\#}$ and $Q_k=R(-k)R(0)^{\#}$, k being a real integer.

19. An equalizer according to claim 12, wherein said suitable linear function G is of the form $=(Q_{k-1} P_{k-1} - Q_k P_k)$, where $P_k=R(k)R(0)^{\#}$ and $Q_k=R(-k)R(0)^{\#}$, k being a real integer.

20. An equalizer according to claim 12, wherein selection of the equalized received signal from the various diversity outputs for final output is based on the maximum likelihood estimate of the received signals.

21. An equalizer according to claim 12, wherein selection of the equalized received signal from the various diversity outputs for final output is based on the best signal-to-noise ratio (SNR) of the received signals.

22. An equalizer according to claim 12, wherein selection of the equalized received signal from the various diversity outputs for final output is based on the selection of a block column of A which gives the strongest signal contents.

23. A multiple-input multiple-output wireless communication system, in which a wireless channel of said communication system being modeled by a finite-impulse-response (FIR) system of order integer M, comprising:

means for transmitting symbol sequences from a plurality (d) of users at the transmitting end of said system through said wireless channel;

means for receiving said symbol sequences transmitted from said plurality of users with receiver diversity means characterized by a diversity factor of integer N, so that N sets of sampled channel signal outputs corresponding to said symbol sequences are available;

means for equalizing said received sampled channel signal outputs with intent to remove ISI wherein said equalizing means comprises:

means for devising a system convolution matrix A, wherein said matrix A is a generalized Sylvester matrix comprising (L+1) block rows and (M+L+1) block columns of sub-matrices each of which block is a matrix of dimension N×d, wherein the number of rows of A, being the product of N and (L+1), is made to exceed the number of columns of A, being the product of d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a N×1 vector due to system diversity;

means for calculating second order statistics of said vector of sampled channel output signals o(m);

means for selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

24. A method of multiple-input multiple-output communication in a wireless channel, which channel being modeled by a finite-impulse-response (FIR) system of order integer M, said method comprising:

transmitting symbol sequences from a plurality (d) of users at the transmitting end of said system through the said wireless channel;

receiving said symbol sequences transmitted from said plurality of users by a receiver with system diversity characterized by a diversity factor of integer N, so that N sets of sampled channel signal outputs corresponding to said symbol sequences are available;

equalizing said received sampled channel signal outputs with intent to remove ISI wherein said equalizing comprises:

devising a system convolution matrix A, wherein said matrix A is a generalized Sylvester matrix comprising (L+1) block rows and (M+L+1) block columns of sub-matrices each of which block is a matrix of dimension N×d, wherein the number of rows of A, being the product N and (L+1), is made to exceed the number of columns of A, being the product d and (M+L+1), by selecting an appropriate integer L, said matrix A relates a vector of sampled channel output signals o(m) to a vector of corresponding input signal symbol sequences, s(m), transmitted by a plurality (d) of users at the transmitting end of said transmission system by the relationship o(m)=A s(m), wherein o(m) is a vector comprising a selected sampled channel output signal vector (y(m)) and a plurality (L) of sampled channel output signals ([y(m−1), . . . , y(m−L)]) which immediately precede said selected sampled channel output signal y(m), each said sampled channel output signal is a N×1 vector due to system diversity;

calculating second order statistics of said vector of sampled channel output signals o(m);

selecting suitable linear equalizing functions (G) derived from said second order statistics of said sampled channel output signals; and means for algebraically operating said vector of sampled channel output signals o(m) by said linear equalizing functions, said algebraic operations are selected so that the results of such operation are equivalent to removing inter-symbol interference elements from said matrix A by forcing all block columns of the matrix A to zero except for a specific block column of A.

* * * * *

UNITED STATES PATENT AND TRADEMARK OFFICE
CERTIFICATE OF CORRECTION

PATENT NO. : 6,463,099 B1
DATED : October 8, 2002
INVENTOR(S) : Xiren Cao, Zhi Ding and Jie Zhu It is certified that error appears in the above-identified patent and that said Letters Patent is hereby corrected as shown below:

<u>Column 5,</u>
Line 43, should read:
-- $\alpha(n)$" Collective, denotes $[\alpha_1(n), \alpha_2(n), \ldots, \alpha_d(n)]^T$
Line 52, should read:
-- characteristics of a Jordan matrix that , $J^o = I$, and $J^{-1} = J^\dagger$ <u>Column 8,</u>
Line 45, should read:

$$P_{(M'-1)}o(m) = \begin{bmatrix} 0 \\ \vdots \\ 0 \\ H(M)\alpha_o(m) \end{bmatrix}.$$

<u>Column 9,</u>
Line 5, should read:

$$Q_{(m'-1)}o(m) = \begin{bmatrix} H(0)\alpha_0(m - M'+1) \\ 0 \\ \vdots \\ 0 \end{bmatrix}.$$

Line 9, should read: -- therefore it would be apparent that both $P_{(M'-1)}$ and $Q_{(M'-1)}$ --
Line 40, should read: -- $P_{(k-1)}o(m) - P_{(k)}o(m-1) = A)J^{(k-1)d}s_o(m) - J^{kd}s_o(m-1))$.
Line 48, should read:

$$J^{(k-1)d}s_o(m) = \begin{bmatrix} 0_{(k-1)d} \\ \alpha_o(m) \\ \alpha_o(m-1) \\ \vdots \\ \alpha_o(m - M'+k) \end{bmatrix}, \text{ and}$$

UNITED STATES PATENT AND TRADEMARK OFFICE
CERTIFICATE OF CORRECTION

PATENT NO.   : 6,463,099 B1
DATED        : October 8, 2002
INVENTOR(S)  : Xiren Cao, Zhi Ding and Jie Zhu It is certified that error appears in the above-identified patent and that said Letters Patent is hereby corrected as shown below:

<u>Column 9 cont'd,</u>
Line 55, should read:

$$J^{kd} s_o(m) = \begin{bmatrix} 0_{(k-1)d} \\ 0_d \\ \alpha_o(m-1) \\ \vdots \\ \alpha_o(m-M'+k) \end{bmatrix},$$

<u>Column 10,</u>
Line 4, should read:

$$h(k) = \begin{bmatrix} H(k-1) \\ H(k-1) \\ \vdots \\ H(k-L-1) \end{bmatrix} \text{ is the k-th block column of A, and } H(n)=0,$$

Line 53, should read:
-- where $0_{nxm}$ is an zero matrix of dimension nxm and $I_{(M'-k)d}$ is an identity matrix of --

<u>Column 11,</u>
Line 61, should read: -- $(P_k Q_k)^n = P_k Q_k$, and --
Line 67, should read: -- $[(P_k Q_k)^{n_1} - (P_{k+1} Q_{k+1})^{n_2}]^{n_3} o(m) = h(k)\alpha(m-k+1)$ --

<u>Column 12,</u>
Line 2, should read:
-- $[(Q_{k-1} P_{k-1})^{n_1} - (Q_k P_k)^{n_2}]^{n_3} o(m) = h(M'-k+1)\alpha(m-M'+k)$ --

UNITED STATES PATENT AND TRADEMARK OFFICE
CERTIFICATE OF CORRECTION

PATENT NO.    : 6,463,099 B1
DATED         : October 8, 2002
INVENTOR(S)   : Xiren Cao, Zhi Ding and Jie Zhu It is certified that error appears in the above-identified patent and that said Letters Patent is hereby corrected as shown below:

<u>Column 22,</u>
Line 67, should read:
-- variance $\sigma^2_\omega$. Since --

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,463,099 B1
DATED : October 8, 2002
INVENTOR(S) : Xiren Cao, Zhi Ding and Jie Zhu It is certified that error appears in the above-identified patent and that said Letters Patent is hereby corrected as shown below:

<u>Title page,</u>
Item [73], should read:

-- [73] Assignee: The Hong Kong University of Science and Technology, Kowloon (HK) --

Signed and Sealed this

First Day of July, 2003

JAMES E. ROGAN
*Director of the United States Patent and Trademark Office*